June 28, 1932. J. E. JONES 1,864,596

VALVE

Filed May 6, 1931 2 Sheets-Sheet 1

INVENTOR.
JOHN E. JONES
BY Chapin & Neal
ATTORNEYS.

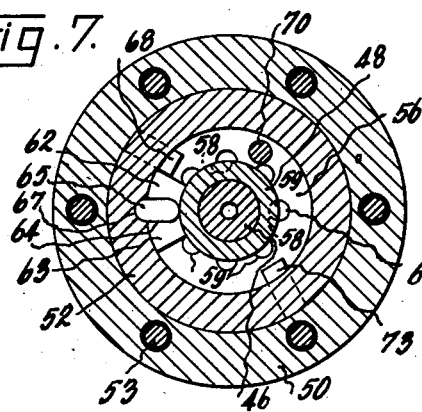
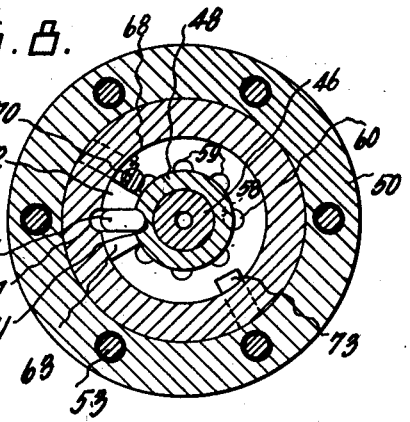
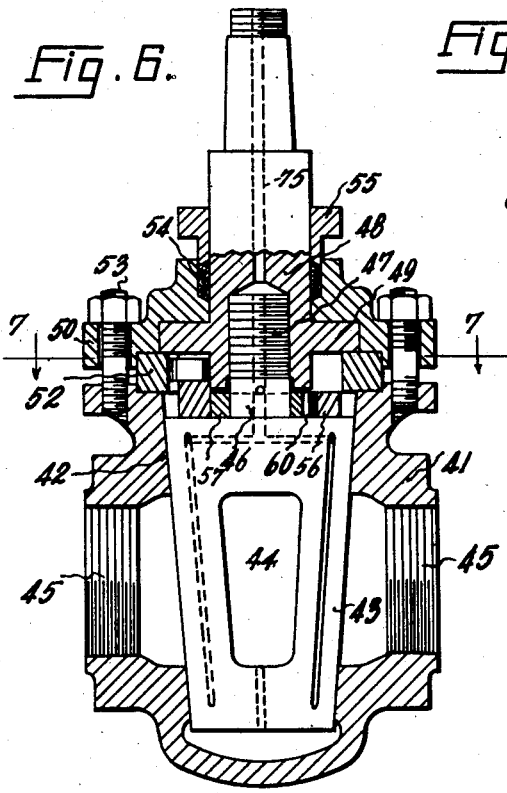
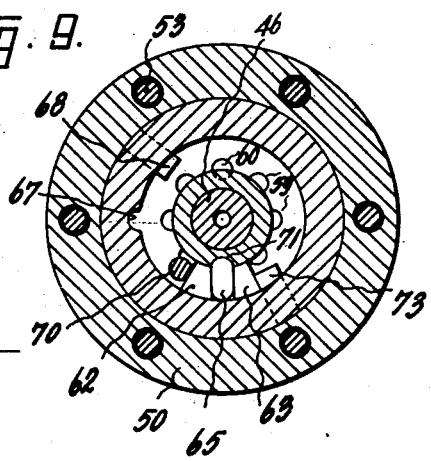

Patented June 28, 1932

1,864,596

UNITED STATES PATENT OFFICE

JOHN E. JONES, OF SPRINGFIELD, MASSACHUSETTS, ASSIGNOR TO CHAPMAN VALVE MANUFACTURING COMPANY, OF INDIAN ORCHARD, MASSACHUSETTS, A CORPORATION OF MASSACHUSETTS

VALVE

Application filed May 6, 1931. Serial No. 535,351.

This invention relates to valves and more particularly to the mechanism for opening and closing the valve.

The principal object of the invention is the provision of positively and automatically acting means actuated by a simple rotary movement of the actuating member to first raise the valve member from its seat and thereafter turn it from closed to open position. Other and further objects will be apparent from the following specification and claims.

In the accompanying drawings which illustrate one embodiment of the invention as applied to a plug cock type of valve:

Fig. 6 is a view similar to Fig. 2 but showing a modified form;

Fig. 7 is a sectional view substantially on the line 7—7 of Fig. 6; and

Figs. 8 and 9 are views similar to Fig. 7 but respectively showing the parts in the position they occupy when the valve has been raised from its seat and when it has been turned to open position.

Figure 1:
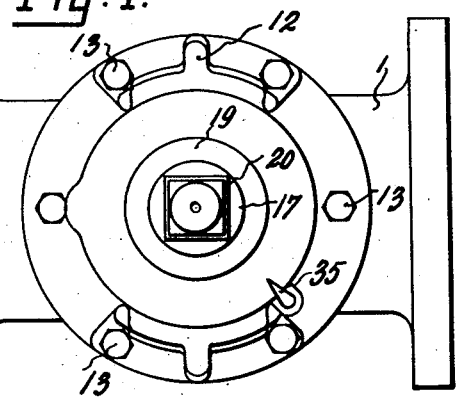
Fig. 1 is a plan view of the valve.
Figure 2:
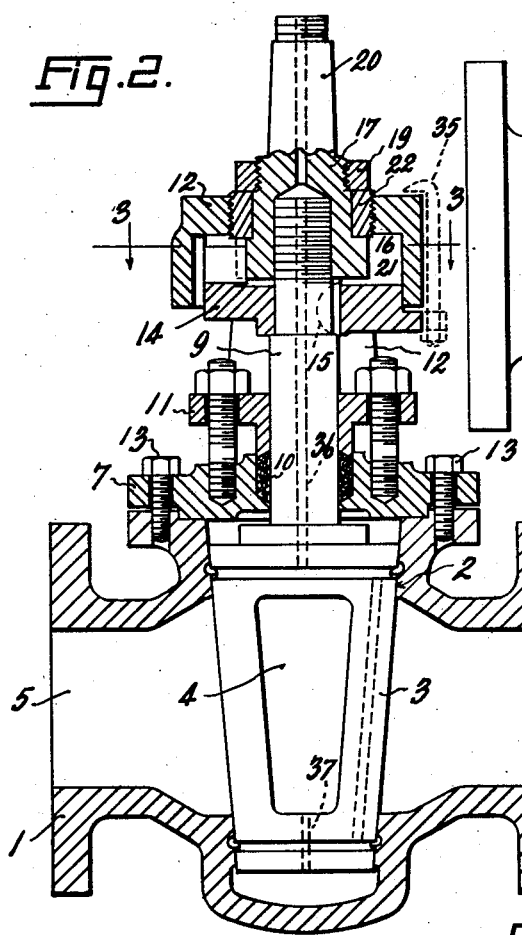
Fig. 2 is a section substantially on line 2—2 of Fig. 1 showing the parts in the position they occupy when the valve is closed and seated.

Referring to Figs. 1 to 5, inclusive, 1 designates the valve casing which is provided with a seat 2 to receive a plug 3 having the customary opening 4 adapted when the valve is in open position to register with the openings 5 of the valve casing. The casing 1 is provided with a cover 7 through which the stem 9 of the valve plug extends. A suitable packing 10 with packing follower 11 prevents the escape of fluid around the stem.

A yoke 12 is mounted on the cover and is held in place by the cover bolts 13. The stem 9 is provided intermediate its length with a collar 14, keyed or otherwise secured to the stem as at 15. The outer end of the stem is threaded as indicated at 16 and engages in a nut 17 rotatably supported in the yoke 12 by a threaded flange 19. The outer end of the nut 17 is provided with an extension or hub 20, squared or otherwise shaped to receive a wrench. The inner end of nut 17 is provided with a flange 21. As will be clear from Fig. 2, flanges 19 and 21 by their engagement with opposite sides of collar 22 which is threaded into the yoke 12 hold nut 17 against axial movement while permitting it to rotate.

Figure 3:
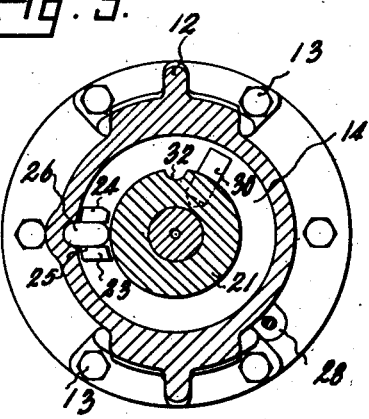
Fig. 3 is a section substantially on line 3—3 of Fig. 2.
Figure 4:
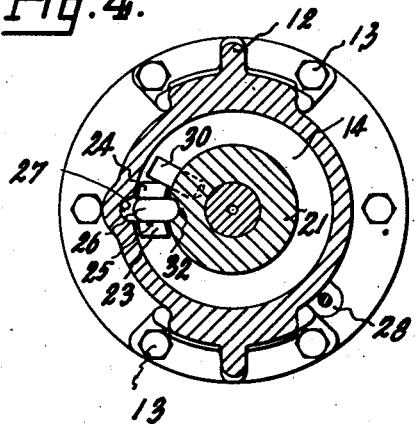
Fig. 4 is a view similar to Fig. 3 but showing the parts in the position they occupy when the valve has been raised from its seat.
Figure 5:
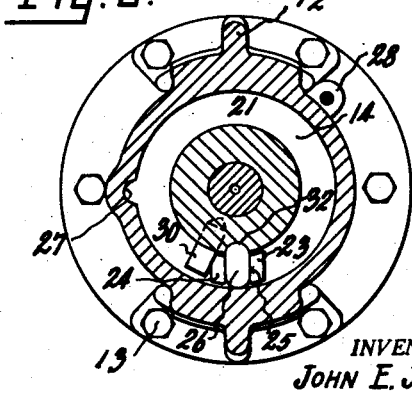
Fig. 5 is a similar view but showing the position of the parts when the raised valve is in open position.

Collar 14 is formed with two upwardly extending lugs 23 and 24 which provide a keyway 25 between them for a key 26. When the valve plug is in closed and seated position, the outer end of key 26 (see Fig. 3) engages in a groove 27 formed in the depending skirt of yoke 12, to lock the stem 9 against rotation. A lug 28 extending from collar 14 engages one leg of yoke 12 when the valve is in closed position as shown in Fig. 3. Flange 21 of nut 17 is provided with a pin 30 positioned to engage lug 24. Since stem 9 is held against rotation by key 26, rotation of nut 17 in a counterclockwise direction, as viewed in Fig. 3, will act to draw the stem upwardly into the nut to raise the valve plug from its seat, this raising of the plug taking place during substantially a quarter turn of the nut or until pin 30 engages lug 24, as shown in Fig. 4. At the same time that pin 30 engages lug 24, a groove 32 formed in the flange 21 of nut 17 is positioned opposite the inner end of key 26 and continued rotation of nut 17 causes the key to leave groove 27 and enter groove 32, as shown in Fig. 4, thus releasing the stem from the yoke and locking it to the nut. Further counterclockwise rotation of nut 17 therefore turns stem 9 and valve plug 3 to open position, lug 28 striking against the opposite yoke leg (as shown in Fig. 5) to stop the plug in open position.

In closing the valve, the operation is merely reversed. Clockwise movement of nut 17 from the position of Fig. 5 turns stem 9 and plug 3 to closed position since the stem is keyed to the nut by key 26. When lug 28 strikes the yoke leg (as shown in Fig. 4) further clockwise rotation of the stem is prevented and key 26 is forced from groove 32 into groove 27, freeing nut 17 from the stem and locking the stem to the yoke. The stem being held against rotation, continued clockwise rotation of nut 17 expels the stem from the nut, causing plug 3 to again firmly seat itself in valve seat 2. Lug 28 may, for convenience in showing the position of the plug, be provided with a pointer 35. The valve plug may be lubricated through the nut and stem in a conventional manner, as indicated in dotted lines at 36. Preferably a small passage 37 is provided through the bottom of the plug to prevent pressure or an air cushion building up beneath the plug.

In the modified form of Figs. 6 to 9, inclusive, the operating mechanism has been placed beneath the cover of the valve casing. In the latter figures, the valve casing is shown at 41, the valve seat at 42 and the valve plug at 43. The valve plug opening is indicated at 44 and cooperating openings in the casing at 45.

Plug 43 is provided with a stem 46 threaded as at 47 for engagement in operating nut 48. Nut 48 is formed with a flange 49 and is held against axial movement by the cover plate 50 which engages the upper side of flange 49 and annular member 52 which engages the underside of said flange. Member 52 is rigidly clamped between the casing 1 and the cover 50 by the cover bolts 53. The upper portion of nut 48 extends outwardly of the cover through packing 54 and packing follower 55 and is shaped to receive a wrench or other operating tool.

An annular ring 56 is adapted to fit over an annular shoulder 57 fixed to or made integral with the plug 43. Two or more semi-circular grooves 58 are formed in shoulder 57 and a plurality of similar grooves 59 are formed on the inner face of ring 56. Ring 56 is keyed to shoulder 57 by a pin 60 positioned in the circular opening formed by the registration of one of the grooves 58 and one of the grooves 59, the spacing of these various grooves being such as to provide a proper range of adjustment of the position of ring 56 with respect to plug 43.

Ring 56 is provided with two spaced lugs 62 and 63 defining a keyway 64 in which a key 65 is adapted to slide. When the valve plug is in closed and seated position, key 65 (see Fig. 7) engages in a groove 67 formed in member 52, thus holding ring 56 and plug 43, to which ring 56 is keyed, against rotation. As shown in Fig. 7, lug 62 is in engagement with a stop pin 68 when the valve plug is in closed position. Flange 49 of nut 48 carries a downwardly extending pin 70 positioned to engage lug 62. Since plug 43 and a stem 46 are held against rotation by key 65, rotation of nut 48 in a counterclockwise direction (as viewed in Fig. 7) will act to draw stem 46 upwardly into the nut, thus raising the valve plug from its seat, this lifting of the plug taking place during substantially a quarter turn of the nut or until pin 70, passing over stop 68, engages lug 62, as shown in Fig. 8. At the same time that pin 70 engages lug 62, a groove 71 formed in nut 48 is positioned opposite the inner end of key 65 and continued rotation of the nut causes key 65 to leave groove 67 and enter groove 71 (as shown in Fig. 8) thus releasing the stem and plug from member 52 and locking it to the nut. Further counterclockwise rotation of nut 48 therefore turns plug 43, now raised from its seat, until lug 63 (as shown in Fig. 9) engages stop pin 73 which defines the open position of the valve plug. The plug is lubricated in any suitable manner as indicated at 75.

In closing the valve, the operation is merely reversed. Clockwise rotation of nut 48 from the position of Fig. 9 turns the stem and plug to closed position defined by stop pin 68. Pin 68 prevents further rotation of the plug, and key 65 is forced from groove 71 into groove 67 of member 52, thus releasing the plug from the nut and again locking the plug against rotation. Further clockwise movement of nut 48 expels stem 46 from the nut, causing the plug to again firmly seat itself in the seat in valve seat 42.

It will be apparent from the two illustrative forms of the invention above described that by providing an intermittent drive between the operating nut and the stem of the valve plug I make it possible to positively unseat and then open the valve by a simple rotary movement of the operating nut and to close the valve and again firmly reseat the valve plug by simply reversing the movement of the operating nut.

While I have illustrated the invention as applied to a plug cock type of valve, it will be understood that it is equally applicable to any valve or similar mechanism where it is desired to axially move or raise and then turn one of the mating members.

What I claim is:

1. A valve which comprises a valve casing, a valve member having a threaded stem, a rotatable nut engaging the threads of the stem, a keyway movable with the valve member, a free key slidably mounted in the keyway and adapted in one position to lock the stem and valve member to a stationary portion of the valve casing and in another position to lock the stem and valve member to the nut, means operative at a predetermined point in the rotation of the nut in one direction to compel the keyway to move with the nut to thereby force the key into position to lock the stem and valve member to the nut and means operative at said point upon reverse rotation of the nut to restrain movement of the keyway to thereby force the key into position to lock the stem and valve member to the casing and means to prevent axial movement of the nut when the stem and valve member are locked to the casing.

2. A valve which comprises a valve casing including a tapered valve seat, a rotatable valve plug fitting in the seat, a threaded stem fixed to the plug, a yoke supported by the valve casing, a rotatable nut engaging the threads of the stem and held against axial movement in the yoke, a collar fixed to the stem adjacent the base of the nut, spaced lugs secured to the collar and forming a keyway, a key slidably mounted in the keyway, a key receiving groove formed in the yoke and positioned to register with one end of the keyway and to receive the key when the valve plug is in closed position, a key receiving groove formed in the nut and positioned to register with the other end of the keyway when the nut has been turned to draw the plug from its seat, a pin carried by the nut adapted to engage one of the keyway lugs to force the key from the groove in the collar into the groove in the nut to cause the plug to thereafter rotate with the nut to valve opening position, and a stop member secured to the collar and positioned to engage the yoke upon the return of the plug and nut to valve closing position to thereby force the key into the groove in the yoke and permit the nut to return to its original position to seat the plug.

3. A valve which comprises a valve casing including a tapered valve seat, a rotatable valve plug fitting in the seat, a threaded stem fixed to the plug, a cover fixed to the casing, an annular member held between the cover and the casing, a rotatable nut engaging the threads of the stem and held against axial movement between the cover and the annular member, a collar adjustably secured to the plug, spaced lugs secured to the collar and forming a keyway, a key slidably mounted in the keyway, a key receiving groove formed in the annular member and positioned to register with one end of the keyway and to receive the key when the valve plug is in closed position, a key receiving groove formed in the nut and positioned to register with the other end of the keyway when the nut has been turned to draw the plug from its seat, a pin carried by the nut adapted to engage one of the keyway lugs to force the key from the groove in the annular member into the groove in the nut to cause the plug to thereafter rotate with the nut to valve opening position, and a stop member secured to the annular member and positioned to engage one of the keyway lugs upon the return of the plug and nut to valve closing position to thereby force the key into the groove in the annular member and permit the nut to return to its original position to seat the plug.

4. A valve structure as in claim 1 including means to adjust the position of the keyway with respect to the valve member.

5. A valve which comprises a valve casing structure including a valve seat, a rotatable valve plug fitting in the seat, a threaded stem fixed to the plug, a rotatable nut engaging the threads of the stem and held against axial movement with respect to the casing, a keyway formed by spaced lugs held in fixed relation with the stem, a free key slidably mounted in the keyway, a key receiving groove formed in the casing structure and positioned to register with one end of the keyway and to receive the key when the valve plug is in closed position, a key receiving groove formed in the nut and positioned to register with the other end of the keyway when the nut has been turned to draw the plug from its seat, means carried by the nut adapted to engage one of the keyway lugs to force the key from the groove in the collar into the groove in the nut to cause the plug to thereafter rotate with the nut to open the valve, and a stop member carried by the stem and engageable with a fixed portion of the casing structure upon return of the plug and nut to valve closing position to thereby force the key into the groove in the casing structure, and permit the nut to return to its original position to seat the valve.

6. A valve which comprises a valve member having a threaded stem, a rotatable nut engaging the threads of the stem, means to hold the nut against axial movement so that free rotation of the nut will draw the stem into the nut and thereby unseat the valve member, connecting means adjustably mounted on the valve member to selectively connect the valve member to a stationary part of the valve or to the nut, and means to actuate said connecting means.

In testimony whereof I have affixed my signature.

JOHN E. JONES.